(12) United States Patent
Campbell et al.

(10) Patent No.: US 11,466,798 B2
(45) Date of Patent: *Oct. 11, 2022

(54) MULTILAYER COMPOSITE PIPE AND PIPE ASSEMBLIES INCLUDING REFLECTIVE INSULATION

(71) Applicant: Titeflex Corporation, Springfield, MA (US)

(72) Inventors: Donald Bradley Campbell, Gallatin, TN (US); Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/203,404

(22) Filed: Mar. 16, 2021

(65) Prior Publication Data

US 2021/0207744 A1 Jul. 8, 2021

Related U.S. Application Data

(63) Continuation-in-part of application No. 17/150,083, filed on Jan. 15, 2021, now Pat. No. 10,995,884, (Continued)

(51) Int. Cl.
*F16L 9/147* (2006.01)
*F16L 11/08* (2006.01)
(Continued)

(52) U.S. Cl.
CPC ............ *F16L 11/08* (2013.01); *B32B 1/08* (2013.01); *B32B 7/12* (2013.01); *B32B 15/09* (2013.01);
(Continued)

(58) Field of Classification Search
CPC . F16L 9/147; F16L 11/04; F16L 11/08; B32B 2311/24; B32B 2597/00; B32B 15/20
(Continued)

(56) References Cited

U.S. PATENT DOCUMENTS 4,370,186 A  1/1983 Blandin et al.
4,614,208 A  9/1986 Skarelius
(Continued)

FOREIGN PATENT DOCUMENTS

DE  202019101108.4 U1  5/2020
EP       1801536 A1  6/2007
(Continued)

OTHER PUBLICATIONS

International Search Report and Written Opinion, PCT Application No. PCT/US2021/042993, dated Dec. 28, 2021.
(Continued)

*Primary Examiner* — Patrick F Brinson
(74) *Attorney, Agent, or Firm* — Saul Ewing Arnstein & Lehr LLP; Brian R. Landry

(57) ABSTRACT

One aspect of the invention provides a composite refrigeration line set including at least one selected from the group consisting of: a suction line and a return line, characterized in that one or more of the suction line and the return line are a composite refrigeration line set tube include: an inner plastic tube; a first adhesive layer positioned about the inner plastic tube; an aluminum layer positioned about the first adhesive layer and coupled to the inner plastic tube via the first adhesive layer; a second adhesive layer positioned about the aluminum layer; and an outer plastic layer positioned about the aluminum layer coupled to the aluminum layer via the second adhesive layer. The inner plastic tube is
(Continued)

polyethylene of raised temperature. The outer plastic tube is polyethylene of raised temperature. The aluminum layer comprises AL 3555-O.

24 Claims, 11 Drawing Sheets

Related U.S. Application Data which is a continuation-in-part of application No. 16/931,571, filed on Jul. 17, 2020, which is a continuation of application No. PCT/US2020/024916, filed on Mar. 26, 2020.

(60) Provisional application No. 62/957,491, filed on Jan. 6, 2020, provisional application No. 62/884,305, filed on Aug. 8, 2019, provisional application No. 62/824,235, filed on Mar. 26, 2019.

(51) Int. Cl.
*B32B 1/08* (2006.01)
*B32B 7/12* (2006.01)
*B32B 15/09* (2006.01)
*B32B 15/20* (2006.01)

(52) U.S. Cl.
CPC .......... *B32B 15/20* (2013.01); *B32B 2307/30* (2013.01); *B32B 2307/54* (2013.01); *B32B 2307/732* (2013.01); *B32B 2597/00* (2013.01)

(58) Field of Classification Search
USPC ................... 138/123–127, 138, 143, DIG. 1; 428/36.9, 36.91
See application file for complete search history.

(56) References Cited

U.S. PATENT DOCUMENTS

| | | |
|---|---|---|
| 4,758,455 A | 7/1988 | Campbell et al. |
| 4,911,778 A | 3/1990 | Barnoach |
| 4,941,437 A | 7/1990 | Suzuki et al. |
| 4,999,903 A | 3/1991 | Bujes |
| 5,009,262 A | 4/1991 | Halstead et al. |
| 5,580,405 A | 12/1996 | Palmer |
| 6,074,717 A | 6/2000 | Little et al. |
| 6,142,707 A | 11/2000 | Bass et al. |
| 6,293,311 B1 | 9/2001 | Bushi et al. |
| 6,401,761 B1 | 6/2002 | Katayama et al. |
| 6,546,963 B2 | 4/2003 | Nuss |
| 6,604,552 B2 | 8/2003 | Hansen et al. |
| 6,652,939 B2 | 11/2003 | Smith et al. |
| 6,685,872 B2 | 2/2004 | Dooley et al. |
| 6,822,023 B2 | 11/2004 | Stuart |
| 7,055,553 B2 | 6/2006 | Bessette et al. |
| 7,478,654 B2 | 1/2009 | Haines |
| 7,644,736 B2 | 1/2010 | Bittenbender et al. |
| 7,857,010 B1 | 12/2010 | Davidson |
| 7,913,719 B2 | 3/2011 | Werner et al. |
| 8,365,568 B2 | 2/2013 | Biris et al. |
| 8,470,423 B2 | 6/2013 | Jarvenkyla |
| 8,651,148 B2 | 2/2014 | Jespersen |
| 8,714,203 B2 | 5/2014 | Theis |
| 8,800,604 B2 | 8/2014 | Sont et al. |
| 8,944,113 B2 | 2/2015 | Shafer et al. |
| 9,234,610 B2 | 1/2016 | Baxi et al. |
| 9,429,256 B2 | 8/2016 | Baccaro et al. |
| 9,759,355 B2 | 9/2017 | Daugherty et al. |
| 9,937,527 B2 | 4/2018 | Ericsson et al. |
| 9,968,017 B2 | 5/2018 | Yamasaki et al. |
| 10,160,580 B2 | 12/2018 | Suter et al. |
| 10,392,496 B2 | 8/2019 | Ericsson et al. |
| 10,544,886 B2 | 1/2020 | Sanni et al. |
| 10,995,884 B1 | 5/2021 | Campbell |
| 2002/0023447 A1 | 2/2002 | Podtchereniaev |
| 2003/0049400 A1 | 3/2003 | Smith et al. |
| 2003/0127147 A1 | 7/2003 | Van Dam et al. |
| 2004/0061091 A1 | 4/2004 | Tieken |
| 2004/0182463 A1 | 9/2004 | Bessette et al. |
| 2006/0272727 A1 | 12/2006 | Dinon et al. |
| 2007/0200342 A1 | 8/2007 | Roberts-Moore et al. |
| 2008/0036198 A1 | 2/2008 | Roberts-Moore et al. |
| 2009/0038704 A1 | 2/2009 | Sausner et al. |
| 2010/0101292 A1 | 4/2010 | Biris et al. |
| 2010/0107682 A1 | 5/2010 | Cartheuser |
| 2010/0221473 A1 | 9/2010 | Biris |
| 2011/0100497 A1 | 5/2011 | Stette |
| 2012/0091144 A1 | 4/2012 | Baumgartner et al. |
| 2013/0126032 A1 | 5/2013 | Bassi et al. |
| 2015/0226440 A1 | 8/2015 | Lipinski et al. |
| 2018/0202583 A1 | 7/2018 | Rimal |
| 2019/0017646 A1 | 1/2019 | Roseen |

FOREIGN PATENT DOCUMENTS

| | | |
|---|---|---|
| EP | 2899471 B1 | 2/2017 |
| JP | 2005172168 A | 6/2005 |
| WO | 2013165452 A1 | 11/2013 |

OTHER PUBLICATIONS

ASTM International, "Standard Specification for Polyethylene/Aluminum/Polyethylene (PE-AL-PE) Composite Pressure Pipe", Apr. 2001, 9 pages.
Detlef Schramm & Mark Jeruzal, PE-RT, "A New Class of Polyethylene for Industrial Pipes", downloaded Dec. 31, 2019, 11 pages.
Multi-Flex Pipe Systems, LLC, "Multi-Flex", www.multiflexpipe.com, (file creation date = Oct. 27, 2015), 16 pages.
Multi-Flex Pipe Systems, LLC, "Multi-Flex, Installation Guide", (file creation date = Oct. 27, 2015), 61 pages.
Multi-Flex Pipe Systems, LLC, "Multi-Flex Pipe: The Next Generation HVAC/R Piping Solution", (file creation date = Apr. 27, 2015), 2 pages.
Plastics Pipe Institute, "Pex-Aluminum-Pex Composite (PEX-AL-PEX)", downloaded Mar. 22, 2019, 4 pages.
SKZ Testing GmbH, "Certificate", Mar. 9, 2016, 2 pages.
Standard Specification for Polyethylene of Raised Temperature/Aluminum/Polyethylene of Raised Temperature PERT/AL/PE-RT) Composite Pressure Pipe, "Designation: F3346-19", 10 pages.
UL 207, Standard for Safety, "Refrigerant-Containing Components and Accessories, Nonelectrical", Jun. 13, 2014, 46 pages.
Wikipedia, "Cross-linked polyethylene", https://en.wikipedia.org/wiki/Cross-linked_polyethylene#PEX-AL-PEX, downloaded Mar. 22, 2019, 13 pages.
Wikipedia, "Emissivity", https://en.wikipedia.org/wiki/Emissivity, downloaded Mar. 20, 2020, 13 pages.
Wikipedia, "Hot-melt adhesive", https://en.wikipedia.org/wiki/Hot-melt_adhesive, downloaded Dec. 30, 2019, 12 pages.
Wikipedia, "Reflectance", https://en.wikipedia.org/wiki/Reflectance#Reflectivity, downloaded Mar. 20, 2020, 11 pages.
Gallagher, "Yoga Pipe ACR, The Next Generation of ACR Pipe", downloaded Nov. 28, 2019, 8 pages.
ASTM International, "Standard Specification for Polyethylene of Raised Temperature/Aluminum/Polyethylene of Raised Temperature (PERT/AL/PE-RT) Composite Pressure Pipe, Designation: F3346-19", Jun. 2019, 10 pages.
"PMG Listing Criteria for PERT-AL-PERT Pipe and Fittings for Refrigeration Applications", Nov. 2015, 5 pages.
"Search Report, Spanish Patent Application No. 202190055", dated Mar. 9, 2022.
"Standard Specification for Polyethylene of Raised Temperature/Aluminum/Polyethylene of Raised Temperature (PE-RT/AL/PE-RT) Composite Pressure Pipe based on Inner Diameter (ID) for use in Air Conditioning and Refrigeration Line Set Systems", Apr. 2021, 9 pages.
Office Action, U.S. Appl. No. 17/150,107, filed Jul. 20, 2022.
Office Action, U.S. Appl. No. 16/931,571, dated Aug. 5, 2022.

MULTILAYER COMPOSITE PIPE AND PIPE ASSEMBLIES INCLUDING REFLECTIVE INSULATION

CROSS-REFERENCE TO RELATED APPLICATION(S)

This application is a continuation-in-part under 35 U.S.C. § 120 of U.S. patent application Ser. No. 17/150,083, filed Jan. 15, 2021, which is a continuation-in-part under 35 U.S.C. § 120 of U.S. patent application Ser. No. 16/931,571, filed Jul. 17, 2020, which is a continuation under 35 U.S.C. § 120 of International Application No. PCT/US2020/024916, filed Mar. 26, 2020, which claims priority to U.S. Provisional Patent Application Ser. No. 62/824,235, filed Mar. 26, 2019; U.S. Provisional Patent Application Ser. No. 62/884,305, filed Aug. 8, 2019; and U.S. Provisional Patent Application Ser. No. 62/957,491, filed Jan. 6, 2020. The entire contents of these applications are hereby incorporated by reference herein.

BACKGROUND OF THE INVENTION

Multilayer composite pipes are designed and used to convey liquids, primarily water, for applications such as in floor heating, radiator heating, and water supply.

SUMMARY OF THE INVENTION

One aspect of the invention provides a composite refrigeration line set including at least one selected from the group consisting of: a suction line and a return line, characterized in that one or more of the suction line and the return line are a composite refrigeration line set tube include: an inner plastic tube; a first adhesive layer positioned about the inner plastic tube; an aluminum layer positioned about the first adhesive layer and coupled to the inner plastic tube via the first adhesive layer; a second adhesive layer positioned about the aluminum layer; and an outer plastic layer positioned about the aluminum layer coupled to the aluminum layer via the second adhesive layer. The inner plastic tube is polyethylene of raised temperature. The outer plastic tube is polyethylene of raised temperature. The aluminum layer comprises AL 3555-O. The aluminum layer has a thickness range for a given pipe size as follows for the indicated pipe sizes:

| Pipe Size (in) | AL 3555-O (in) |
|---|---|
| ¼" | 0.01-0.018 |

This aspect of the invention can have a variety of embodiments. The aluminum layer can be butt-welded to itself In some embodiments, the aluminum layer does not include a corrosion-inhibiting protective coating.

The composite refrigeration line set can further include a low-emissivity layer positioned about the outer plastic layer. The low-emissivity layer can include low-emissivity aluminum. The low-emissivity layer can include a metallized film.

The composite refrigeration line set tube can have a burst pressure in excess of 1950 pounds per square inch.

The composite refrigeration line set tube can further include a reinforcement layer.

Another aspect of the invention provides a refrigeration system including: a compressor; an evaporator coil; the composite refrigeration line set as described herein coupled between the compressor and the evaporator coil to form a fluid circuit between the compressor and the evaporator coil; and a refrigerant received within the fluid circuit.

Another aspect of the invention provides composite refrigeration line set including at least one selected from the group consisting of: a suction line and a return line, characterized in that one or more of the suction line and the return line are a composite refrigeration line set tube including: an inner plastic tube; a first adhesive layer positioned about the inner plastic tube; an aluminum layer positioned about the first adhesive layer and coupled to the inner plastic tube via the first adhesive layer; a second adhesive layer positioned about the aluminum layer; and an outer plastic layer positioned about the aluminum layer coupled to the aluminum layer via the second adhesive layer. The inner plastic tube is polyethylene of raised temperature. The outer plastic tube is polyethylene of raised temperature. The aluminum layer includes AL 3555-O. The aluminum layer has a thickness range for a given pipe size as follows for the indicated pipe sizes:

| Pipe Size (in) | AL 3555-O (in) |
|---|---|
| ⅜" | 0.014-0.022 |
| ½" | 0.02-0.028 |
| ⅝" | 0.028-0.035 |

This aspect of the invention can have a variety of embodiments. The aluminum layer can be butt-welded to itself. The composite refrigeration line set tube can have a burst pressure in excess of 1950 pounds per square inch. The composite refrigeration line set tube can further include a reinforcement layer.

Another aspect of the invention provides a refrigeration system including: a compressor; an evaporator coil; the composite refrigeration line set as described herein coupled between the compressor and the evaporator coil to form a fluid circuit between the compressor and the evaporator coil; and a refrigerant received within the fluid circuit.

Another aspect of the invention provides composite refrigeration line set including at least one selected from the group consisting of: a suction line and a return line, characterized in that one or more of the suction line and the return line are a composite refrigeration line set tube including: an inner plastic tube; a first adhesive layer positioned about the inner plastic tube; an aluminum layer positioned about the first adhesive layer and coupled to the inner plastic tube via the first adhesive layer; a second adhesive layer positioned about the aluminum layer; and an outer plastic layer positioned about the aluminum layer coupled to the aluminum layer via the second adhesive layer. The inner plastic tube is polyethylene of raised temperature. The outer plastic tube is polyethylene of raised temperature. The aluminum layer includes AL 3555-O. The aluminum layer has a thickness range for a given pipe size as follows for the indicated pipe sizes:

| Pipe Size (in) | AL 3555-O (in) |
|---|---|
| ¾" | 0.033-0.041 |

Another aspect of the invention provides a refrigeration system including: a compressor; an evaporator coil; the composite refrigeration line set as described herein coupled between the compressor and the evaporator coil to form a fluid circuit between the compressor and the evaporator coil; and a refrigerant received within the fluid circuit.

Another aspect of the invention provides composite refrigeration line set including at least one selected from the group consisting of: a suction line and a return line, characterized in that one or more of the suction line and the return line are a composite refrigeration line set tube including: an inner plastic tube; a first adhesive layer positioned about the inner plastic tube; an aluminum layer positioned about the first adhesive layer and coupled to the inner plastic tube via the first adhesive layer; a second adhesive layer positioned about the aluminum layer; and an outer plastic layer positioned about the aluminum layer coupled to the aluminum layer via the second adhesive layer. The inner plastic tube is polyethylene of raised temperature. The outer plastic tube is polyethylene of raised temperature. The aluminum layer includes AL 3555-O. The aluminum layer has a thickness range for a given pipe size as follows for the indicated pipe sizes:

| Pipe Size (in) | AL 3555-O (in) |
|---|---|
| ⅞" | 0.037-0.047 |
| 1 ⅛" | 0.047-0.059 |

Another aspect of the invention provides a refrigeration system including: a compressor; an evaporator coil; the composite refrigeration line set as described herein coupled between the compressor and the evaporator coil to form a fluid circuit between the compressor and the evaporator coil; and a refrigerant received within the fluid circuit.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
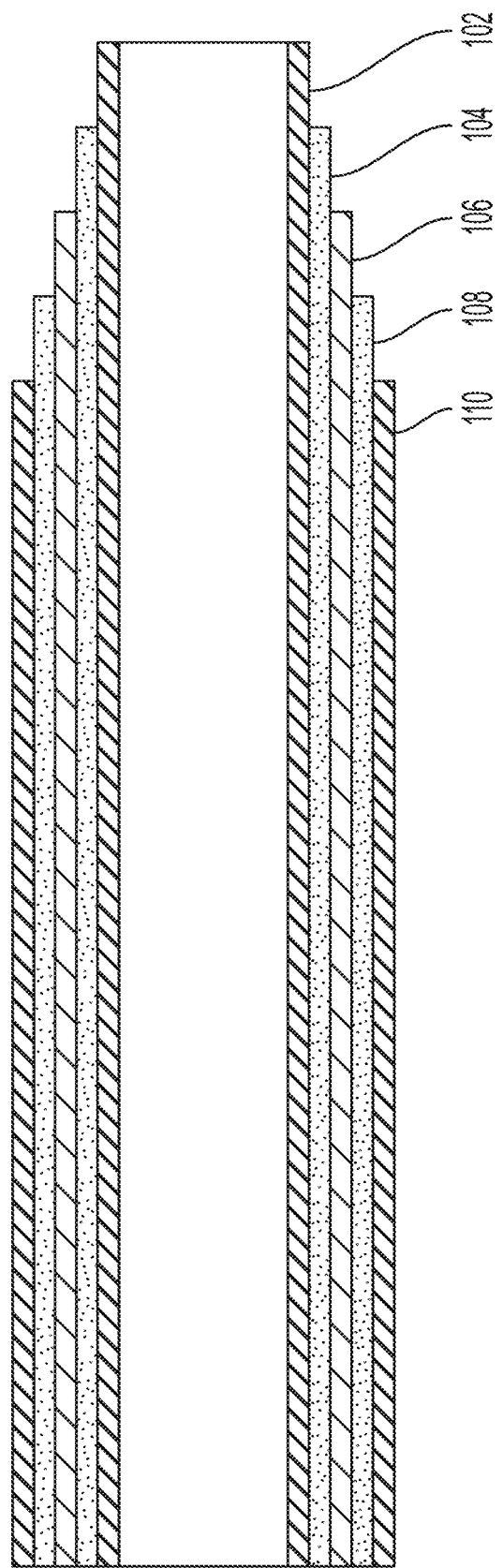
FIG. 1 depicts a plastic/gas-barrier/plastic composite tube according to an embodiment of the invention.

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based super-alloys (available, e.g., under the INCONEL® trademark from Huntington Alloys Corporation of Huntington, W. Va.), brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used in the specification and claims, the term "fiberglass" refers to fiber-reinforced plastic using glass fiber. Generally speaking, "E-glass" is understood to refer to alumina-calcium-borosilicate glasses used as a general purpose reinforcement where strength and high electrical resistivity are desired, while "S-glass" is understood to refer to magnesium aluminosilicate glasses used for textile substrates or reinforcement in composite structural applications that require high strength, modulus, and durability under conditions of extreme temperature or corrosive environments.

Unless specifically stated or obvious from context, the term "or," as used herein, is understood to be inclusive.

As used herein, the term "metal" refers to any chemical element that is a good conductor of electricity and/or heat, and alloys thereof. Examples of metals include, but are not limited to, aluminum, cadmium, niobium (also known as "columbium"), copper, gold, iron, nickel, platinum, silver, tantalum, tin, titanium, zinc, zirconium, and the like.

As used herein, the term "resin" refers to any synthetic or naturally occurring polymer.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Multilayer Composite Pipes

Multilayer composite pipes can be fabricated from multiple layers of material including various plastics, adhesives and, in some cases metal layers. Exemplary constructions are summarized below.

TABLE 1

Exemplary Multilayer Composite Pipe Constructions

| Short Name | Components |
|---|---|
| PE/AL/PE | Polyethylene/Aluminum/Polyethylene |
| PEX/AL/PEX | Cross-linked Polyethylene/Aluminum/Cross-linked Polyethylene |
| PERT/AL/PERT | Polyethylene of raised temperature/Aluminum/Polyethylene of raised temperature |

Referring to FIG. 1, these constructions can include an inner layer of a type of plastic 102, a layer of adhesive 104, a gas (e.g., oxygen) barrier (e.g., a layer of metal such as aluminum) 106, a layer of adhesive 108, and an outer layer of a type of plastic 110.

Plastic layers 102, 110 can be selected from a variety of materials such as thermoplastics, thermoplastic elastomers, polyethylene, polyethylene, polypropylene, polyvinyl chloride (PVC), polyamide, fluoropolymers, polyvinylidene fluoride (PVDF), fluorinated ethylene propylene (FEP), perfluroalkoxy alkane (PFA), and the like.

The metal layer(s) can be aluminum or aluminum alloys such as aluminum-manganese alloy. Exemplary aluminum alloys include the 1000 series (e.g., 1050, 1070, and the like), 3000 series (e.g., 3003, 3004, 3005, 3555, 3103, 3105, etc.), 5000 series (e.g., 5052) 6000 series (e.g., 6060, 6061, and the like), and 8000 series (e.g., 8006, 8011, and the like). A variety of tempers can be utilized including —O (full soft (annealed).

In some embodiments, a corrosion-inhibiting protective coating can be applied to alloys having high magnesium content (0.8% and greater such as in AL 5052-O and AL 3004-O) to prevent blooming or oxidation of the magnesium on the surface of the aluminum alloy.

A variety of suitable thicknesses for alloys are provided below to achieve a burst pressure in excess of 1950 psi at ambient temperature. As can be seen, a multitude of thickness ranges for the reinforcement material, pipe thickness, and reinforcement material composition can be used in the pipe construction, while still allowing for burst pressure thresholds to be in excess of the 1950 psi requirement for some piping use fields (e.g., Underwriters Laboratories Inc. Standard for Safety for Refrigerant Containing Components and Accessories, Nonelectrical (UL 207)). ("Pipe size" is a nominal size to replicate the inner diameter of ACR soft copper tubing for the equivalent ACR soft copper outer diameter. The relationship between the outer diameter and inner diameter for ACR soft copper is provided as Table 3.)

TABLE 2

Thickness Ranges to Achieve 13.44 MPa Requirement Under UL 207 Standard for Various Single-Aluminum-Alloy-Layer Composite Pipe

| Pipe Size | | AL 5052-O Thickness | | AL 3004-O Thickness | |
|---|---|---|---|---|---|
| (in) | (mm) | (in) | (mm) | (in) | (mm) |
| ¼" | 12 | 0.01-0.018 | 0.25-0.46 | 0.01-0.018 | 0.25-.46 |
| ⅜" | 14 | 0.012-0.018 | 0.3-0.46 | 0.014-0.02 | 0.35-0.5 |
| ½" | 16 | 0.018-0.024 | 0.45-0.6 | 0.02-0.026 | 0.5-0.65 |
| ⅝" | 18 | 0.022-0.032 | 0.55-0.82 | 0.024-0.032 | 0.6-0.81 |
| ¾" | 20 | 0.028-0.037 | 0.7-0.94 | 0.031-0.037 | 0.8-0.95 |
| ⅞" | 25 | 0.031-0.041 | 0.8-1.04 | 0.035-0.043 | 0.9-1.1 |
| 1 ⅛" | 32 | 0.041-0.051 | 1.05-1.3 | 0.045-0.055 | 1.15-1.4 |

| Pipe Size | | ALERIS® AL 3555-O Thickness | | AL 3005-O Thickness | |
|---|---|---|---|---|---|
| (in) | (mm) | (in) | (mm) | (in) | (mm) |
| ¼" | 12 | 0.01-0.018 | 0.25-0.46 | 0.014-0.02 | 0.35-0.5 |
| ⅜" | 14 | 0.014-0.022 | 0.3-0.55 | 0.014-0.026 | 0.35-0.65 |
| ½" | 16 | 0.02-0.028 | 0.5-0.7 | 0.02-0.035 | 0.5-0.9 |
| ⅝" | 18 | 0.028-0.035 | 0.7-0.9 | 0.028-0.045 | 0.7-1.15 |
| ¾" | 20 | 0.033-0.041 | 0.85-1.05 | 0.033-0.053 | 0.8-1.35 |
| ⅞" | 25 | 0.037-0.047 | 0.95-1.2 | 0.037-0.061 | 0.9-1.55 |
| 1 ⅛" | 32 | 0.047-0.059 | 1.1-1.5 | 0.047-0.077 | 1.1-1.95 |

| Pipe Size | | AL 6061-O Thickness | | AL 3105-O Thickness | |
|---|---|---|---|---|---|
| (in) | (mm) | (in) | (mm) | (in) | (mm) |
| ¼" | 12 | 0.014-0.022 | 0.35-0.55 | 0.016-0.022 | 0.4-0.55 |
| ⅜" | 14 | 0.014-0.028 | 0.35-0.7 | 0.022-0.03 | 0.55-0.75 |
| ½" | 16 | 0.02-0.037 | 0.5-0.95 | 0.031-0.041 | 0.8-1.05 |
| ⅝" | 18 | 0.028 0.047 | 0.7-1.2 | 0.039-0.051 | 1.0-1.3 |
| ¾" | 20 | 0.033-0.057 | 0.8-1.45 | 0.049-0.059 | 1.25-1.5 |
| ⅞" | 25 | 0.037-0.063 | 0.9-1.6 | 0.055-0.067 | 1.4-1.7 |
| 1 ⅛" | 32 | 0.047-0.081 | 1.19-2.05 | 0.071-0.087 | 1.8-2.2 |

| Pipe Size | | AL 3003-O Thickness | | AL 8006-O Thickness | |
|---|---|---|---|---|---|
| (in) | (mm) | (in) | (mm) | (in) | (mm) |
| ¼" | 12 | 0.018-0.024 | 0.45-0.6 | 0.018-0.024 | 0.45-0.6 |
| ⅜" | 14 | 0.024-0.033 | 0.6-0.85 | 0.024-0.033 | 0.6-0.85 |
| ½" | 16 | 0.033-0.043 | 0.85-1.1 | 0.033-0.043 | 0.85-1.1 |

TABLE 2-continued

Thickness Ranges to Achieve 13.44 MPa Requirement Under UL 207 Standard for Various Single-Aluminum-Alloy-Layer Composite Pipe

| ⅝" | 18 | 0.041-0.055 | 1.05-1.4 | 0.041-0.055 | 1.05-1.4 |
|---|---|---|---|---|---|
| ¾" | 20 | 0.051-0.065 | 1.3-1.65 | 0.051-0.065 | 1.3-1.65 |
| ⅞" | 25 | 0.059-0.073 | 1.5-1.85 | 0.059-0.073 | 1.5-1.85 |
| 1 ⅛" | 32 | 0.075-0.093 | 1.9 2.35 | 0.075-0.093 | 1.9-2.35 |

TABLE 3

ACR Copper Pipe Sizes (inches)

| | Pipe Identification | | | | | | |
|---|---|---|---|---|---|---|---|
| | ¼" | ⅜" | ½" | ⅝" | ¾" | ⅞" | 1⅛" |
| Outer Diameter (OD) | 0.25 | 0.375 | 0.5 | 0.625 | 0.75 | 0.875 | 1.225 |
| Inner Diameter (ID) | 0.19 | 0.311 | 0.436 | 0.555 | 0.68 | 0.785 | 1.025 |

Reinforcing Members

For common water conveyance applications, standard multilayer composite pipes are sufficient and work well given their flexibility and light-weight nature. Also, given the previously mentioned benefits of the product, there are many other applications where this type of pipe may be used. These other applications could include the conveyance of other types of liquids and gases such as refrigerants, natural gas, propane, and process and medical gases such as argon, helium, nitrogen, and the like. Depending on the application of the use for the multilayer composite pipe, greater performance standards may be required making it necessary to further enhance the standard multilayer product design to ensure higher pressure and temperature limits. This enhancement can be accomplished by adding yet another layer of material to the overall construction, thereby creating a reinforcement layer. Additionally or alternatively, the reinforcement can be added within the one of the layers described above.

The reinforcement can be constructed in several forms. For example, the reinforcement can be spirally (e.g., helically) wrapped, longitudinal, braided, and the like under, over, or within any of the layers. For example, a reinforcement layer can be around or within the inner layer of plastic 102, around or within the outer layer of plastic 110, around the gas (e.g., oxygen) barrier (e.g., metal) layer 106, or around or within the adhesive layers 104, 108. The reinforcement layer can completely cover or partially cover the surface of a pipe layer 102, 104, 106, 108, 110.

The reinforcement material can include one or more individual material spirals wrapped around the pipe (e.g., one material spirally wound with axial pitch of 0.25" or four spirals with individual pitch of 1" or 0.25" collectively). Pipe capacity (e.g., in terms of burst strength) can be adjusted based on pitch, material selection, and the like. For example, the tubing can have a burst pressure in excess of 1,900 psi at 70° F. and 1,500 psi at 200° F.

The reinforcement can include one or more materials such as metal foils (e.g., aluminum or copper), plastic films, metal wire, plastic wire, fiberglass cords or fabric (e.g., AR-glass, C-glass, D-glass, E-glass, E-CR-glass, R-glass, S-glass, and the like), any type of filament material, aramids, para-aramids, poly-aramid synthetic fibers, aromatic polyester strands, and the like. The reinforcing materials can be coated (e.g., with a binder or primer), machined (e.g., roughened), etched, or otherwise treated to bond to or be embedded within the adhesive layers. In some embodiments, a particular adhesive layer (e.g., a tie resin, a solvent-based adhesive, a hot-melt adhesive, and the like) is utilized to bond particular reinforcements.

In some embodiments, the reinforcement is applied after the product is extruded (e.g., a spiral wrap applied with a wrapping machine). In other embodiments, a spiral wrap is formed with a rotating extrusion crosshead such that the spiral material is extruded within a layer of polymer or adhesive (e.g., wire inside polymer). In still another embodiment, a spiral wrap is formed with a rotating extrusion crosshead (e.g., polyester cord extruded in a helix around an underlying tube). In still another embodiment, a longitudinal wrap can be added to any layer of the pipe.

Multiple Metal Foil Layers

Figure 2:
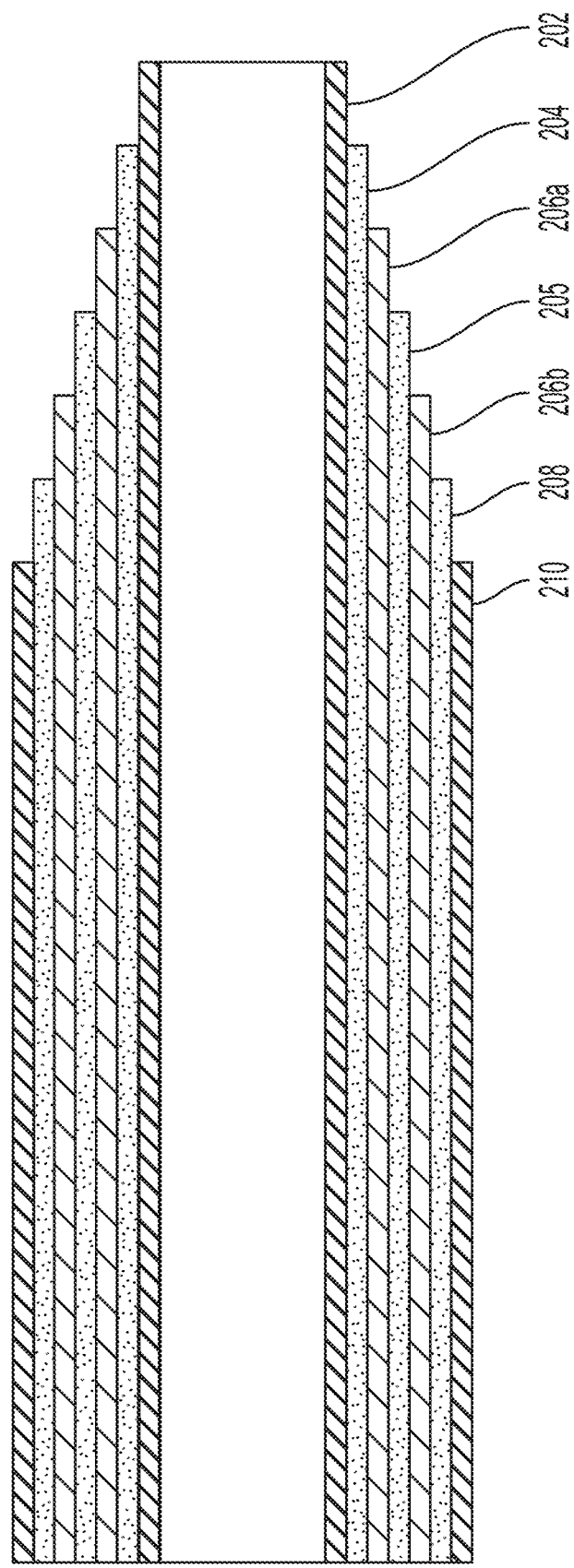
FIG. 2 depicts a composite tube including multiple metal layers according to an embodiment of the invention.

Referring now to FIG. 2, another embodiment of the invention incorporates multiple metal layers 206a, 206b.

Exemplary embodiments are described below from innermost layer to outermost layer in descending order.

TABLE 4

Exemplary Multilayer Composite Pipe Constructions

| Embodiment A | Embodiment B | Embodiment C | Embodiment D |
|---|---|---|---|
| Plastic 202 | Plastic 202 | Plastic 202 | |
| Adhesive 204 | Adhesive 204 | Adhesive 204 | |
| Metal 206a | Metal 206a | Metal 206a | Metal 206a |
| Adhesive 205 | | Adhesive 205 | Adhesive 205 |
| Metal 206b | Metal 206b | Metal 206b | Metal 206b |
| Adhesive 208 | Adhesive 208 | | Adhesive 208 |
| Plastic 210 | Plastic 210 | | Plastic 210 |

Although embodiments having two metal layers 206a, 206b are described above, three or more metal layers could be utilized in accordance with the invention.

The metal layers 206a, 206b can be the same or different with regard to one or more of material, thickness, or other properties. For example, either the inner metal layer 206a or outer metal layer 206b can be thicker than the other layer 206b, 206a. Each metal layer 206a, 206b can be bonded to itself, e.g., through welding (e.g., overlap or butt) with methods such as ultrasonic, laser, tungsten inert gas, and the like).

Adhesive 205 can have a sufficient compressive strength to prevent elongation of metal layers 206a, 206b. Without being bound by theory, Applicant believes that most hot-melt adhesives would have sufficient compressive strength properties.

Without being bound by theory, Applicant believes that a multilayer composite pipe having multiple metal layers 206a, 206b having thicknesses a and b, respectively, will have superior properties (e.g., burst strength, bend radius, bending force, kink resistance) than a multilayer composite pipe having a single metal layer 106 of the same material of thickness c=a+b. For example, the metal layers 206a, 206b may slide past each other during bends.

Multiple metal layers 206a, 206b also avoid single-point failures. Single-point failures in the metal layer can occur for a variety of reasons, but some of the most common are poor weld integrity, reduction of strip thickness, and strip inclusions.

Current constructions of multilayer pipes utilize single aluminum layers that are axially welded with methods such as ultrasonic, laser, and tungsten inert gas, etc. These welding methods can suffer from quality issues that result in reduced strength of the aluminum layer at the weld or heat-affected zone. The locations of these affected areas are small, 0.001" (0.0254 mm) to 0.25" (6.35 mm) in length and, in the case of ultrasonic welding, hidden from view, making conventional quality monitoring difficult. With a single layer of welded metal, the overall burst strength of the tubing can be significantly reduced because of reduced weld quality. The addition of another layer of metal can provide necessary backing to prevent reduction in strength for single point failures. While the simplest construction places both weld seams in the same radial location, further strength improvements are realized when the weld seams are located at opposite radial locations.

Similarly, single-layer metal can suffer decreased performance as a result of reduced strip thickness. The metal strip used to fabricate multilayer pipe can have the thickness inadvertently reduced several ways, with some occurring during the production of the strip and some during the production of the multilayer pipe. Foreign-matter-induced thinness is particularly difficult to identify and prevent. The strip is produced by progressively rolling metal stock down to a suitable thickness. During this process, foreign matter that lands on the stock can be rolled into the stock, creating a reduced thickness in a relatively small area. This can present as a single point failure in a multilayer pipe and can be prevented by the addition of a second layer of welded metal.

The metal strip can also have inclusions (foreign material) in the base material that are not homogenous or compatible with the alloy. After the rolling process, these inclusions can cause a reduction in strength and may present as a single point failure in a single layer of metal. This can be prevented by the addition of a second layer of welded metal.

Pipe Assembly with Reflective Insulation

In another aspect of the invention, a pipe assembly can include an inner component, an outer component, and a reflective insulation system arranged between the two components.

The inner component, hereinafter called the inner pipe, can be a pipe of a diameter and structure/composition designed to transport a fluid there through, e.g., a refrigerant or other fluid needing insulation.

The outer component, hereinafter called the outer pipe, can also be a pipe having a diameter larger than the inner pipe, the diameter difference creating a gap that is part of a reflective insulation system between the inner pipe and the outer pipe that provides insulation value to the pipe assembly.

One example of a reflective insulation system can be to include a reflective material as part of the outer surface of the inner pipe and/or the inner surface of the outer pipe. In some embodiments, the outer pipe consists essentially or solely of a reflective material. This reflective material can be any kind of material having low emissivity ("low-e") (e.g., having an emissivity value of 0.05 or less) to function in the reflective insulation system and can be made part of the outer surface of the inner pipe in any way. For example, a film of low-e material can be adhered to the outer surface of the line set pipe using an adhesive. The reflective layer can be roll-formed and welded or extruded over the inner most layer of the inner pipe. An example of such an adhered material can be a layer of aluminum, which can be adhered to the outer surface of the line set pipe using an adhesive, for example. For example, the low-e layer can be uncovered metal layer 206b in Embodiment C and provide both mechanical strength and low emissivity. The added outer layer of aluminum can provide a reflective low-e surface as part of the reflective insulation system. In some embodiments, the outer metal layer can be polished, either prior to or after formation of the inner pipe.

The other part of the reflective insulation system is a gap that is created by the diameter difference between the inner and outer pipe, the gap being of sufficient size to provide a meaningful R-value to the pipe assembly, e.g., at least that provided by foam insulation of the prior art. An example of such an R-value obtained by practicing the invention is approximately an R-3.

Spacer structures can ensure that the gap between the inner pipe and outer pipe is maintained, so that the thermal effect of the reflective insulation system along the length of the pipe assembly is not compromised by a reduction in the gap size. The spacer structure to maintain the gap can be achieved by a number of different techniques, including using components in addition to the inner and outer pipe or using a part of the outer pipe as a spacer structure.

Figure 3:
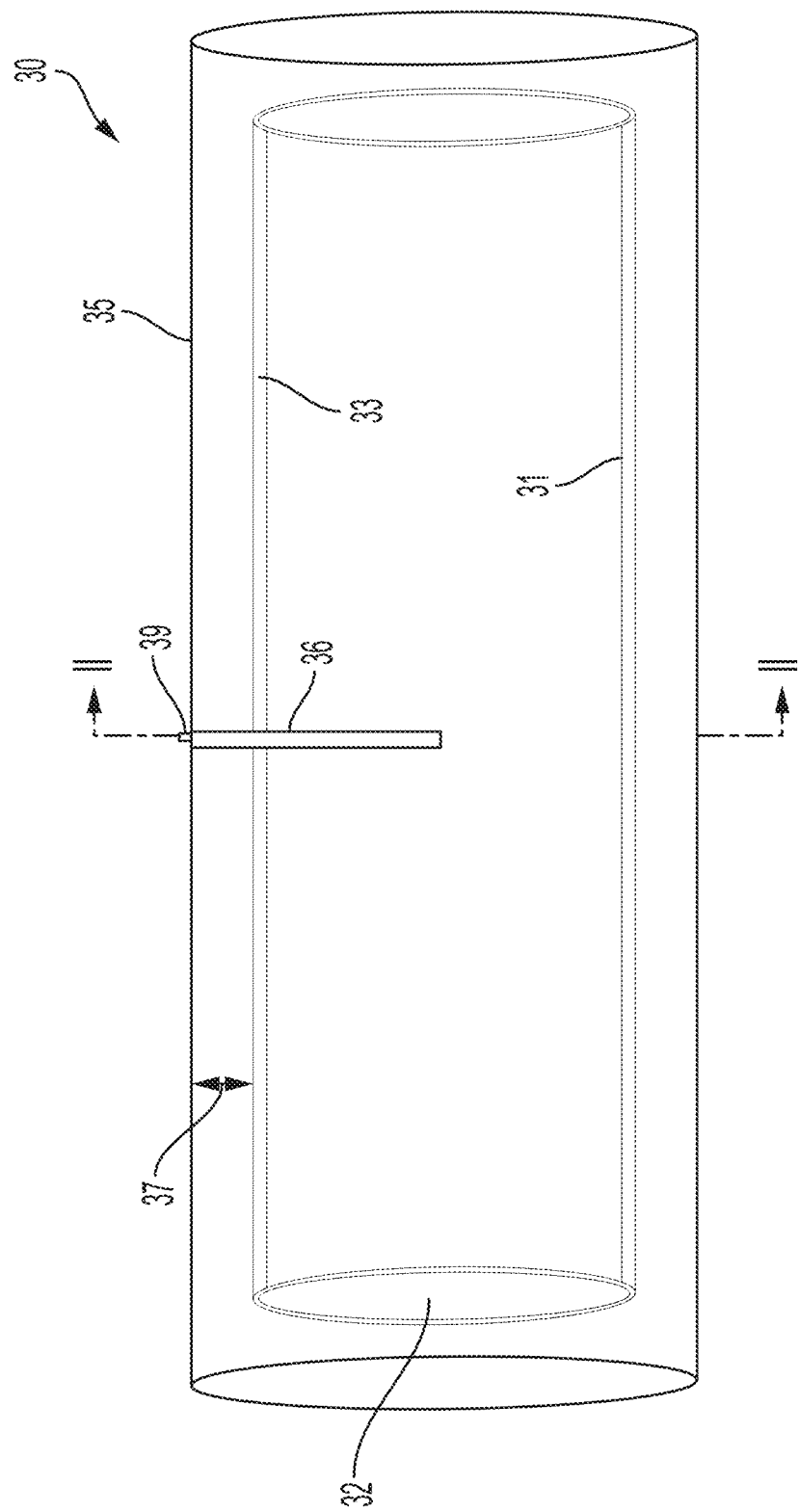
FIG. 3 depicts a schematic of a first embodiment of a pipe assembly with reflective insulation using a clip for spacing purposes according to an embodiment of the invention.
Figure 4:
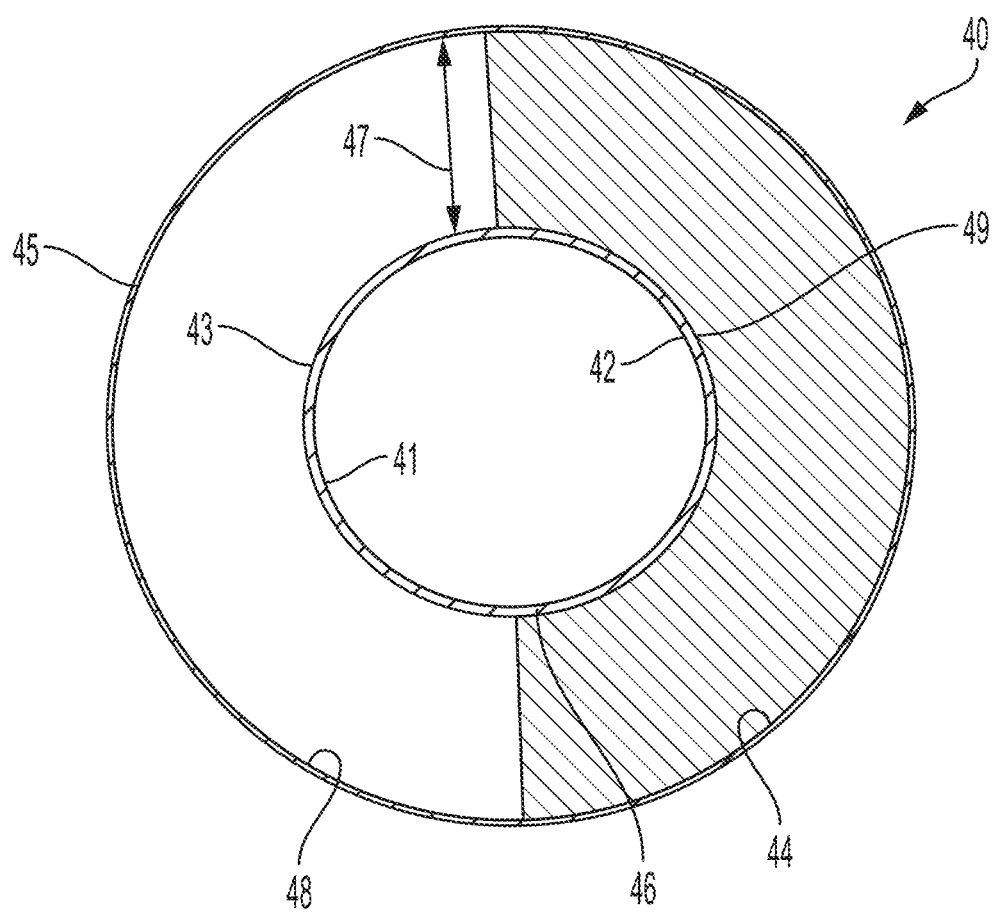
FIG. 4 depicts a cross section of the embodiment of FIG. 3 along the line II-II of FIG. 3.

A first kind of spacer structure may be a mechanical kind, wherein spacers are positioned between the outer surface of the inner pipe and the inner surface of the outer pipe. The spacers can also be spaced apart from each other and positioned along the length of the inner pipe so that the gap is maintained over the run or length of the pipe assembly. This embodiment is depicted in FIGS. 3 and 4, where a pipe assembly is designated by the reference numeral 30. The pipe assembly 30 includes an inner pipe 31 having a reflective outer surface 33, e.g., an aluminum layer. The inner pipe 31 can include a flow channel 32, which allows fluid flow during use of the pipe assembly 30.

The outer pipe is designated by the reference numeral 35. The gap between the inner pipe and outer pipe is designated by the reference numeral 37 and is created as a result of the diameter difference of the inner pipe 31 and outer pipe 35.

Also shown is a clip 39 as an exemplary spacer structure. In FIG. 4, the clip 49 is shown with a backwards c-shape, with its inner edge 46 configured (e.g., complementary) to be adjacent to the outer aluminum surface 43 of the inner pipe 41. An outer edge 44 of the clip 49 is configured to be adjacent to the inner surface 48 of the outer pipe. The clip 49 can be secured between the inner pipe 41 and outer pipe 45 in any known way. Examples include a snap fit, where the clip 49 can be sized to snap on the inner pipe 41. Another example can be a crimping, where the clip 49 can be deformed so as to grip the outer surface of the inner pipe 41, adhesives, and the like. The material of the clip 49 as well as the inner pipe 41 and outer pipe 45 are discussed below. Having the clip 49 attach to the inner pipe 41 ensures that the clip 49 stays in place and the spacing between adjacent clips and the gap 47 are not disrupted by one or more clips moving along the length of the inner pipe 41. In essence, the low-e outer surface of the inner pipe 41, the gap 47, the clips 49, and the outer pipe 45 together forms one embodiment of a reflective insulation system for the pipe assembly that provides insulating effect for the fluid flowing through the channel 42 of the inner pipe 41.

The spacing between adjacent clips along the run of the pipe assembly can be such that the desired gap is maintained along the length of the run. Too large of a spacing between clips may cause the outer pipe to sag and narrow the gap, thereby affecting the thermal performance of the reflective insulation system. Small spacings are also unnecessary as they can complicate the assembly process, increase cost by increasing the number of spacers, etc. An exemplary spacing is believed to be about 12 inches (about 30 cm) but other spacings, e.g., between 1 foot (about 30 cm) spacing for bends and 6 foot spacing (about 180 cm) for straight runs, can be used as well.

While the gap 37 can be any practical dimension, it is preferred that the gap size range between ¼" (0.636 cm) and 1½" (about 3.8 cm), more preferably range between ½" (about 1.2 cm) and 1¾" (3.175 cm), and most preferably be about 1 inch (2.54 cm). Too small of a gap can result in a low R-value for the reflective insulation system. Too large of a gap can increase the overall diameter of the pipe assembly and can cause problems in the installation as a result of this size increase. Too large of a gap can also increase the size of the outer pipe, which increases costs.

Figure 5:
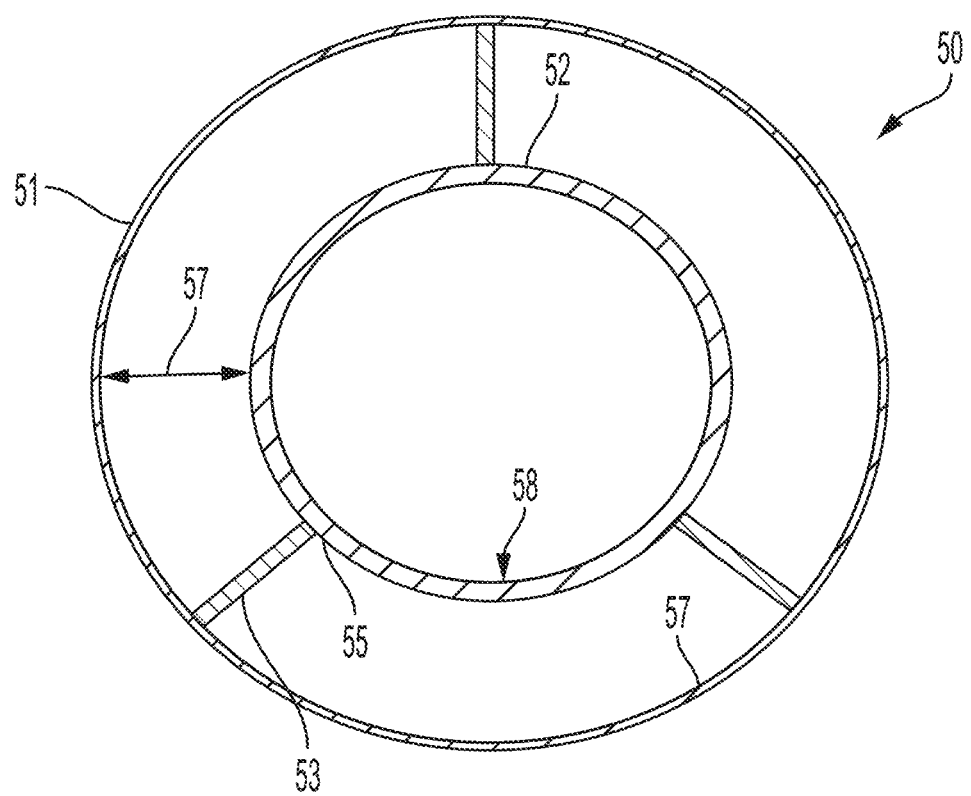
FIG. 5 depicts a sectional view of another embodiment of the pipe assembly with a different spacer structure according to an embodiment of the invention.

Instead of a clip or another mechanical device as a spacer structure, a part of the outer pipe can be employed as a spacer structure. Referring now to FIG. 5, a second spacer structure embodiment is designated by the reference numeral 50. Here, the same inner pipe 58 with its aluminum outer surface 52 is employed. Instead of using the clips 49 as the spacer structure, the outer pipe, designated by the reference numeral 51, is made with fins 53 extending from the outer pipe inner surface 57 in radially-spaced apart locations. The FIG. 5 embodiment shows three fins 53 but more or fewer fins can be used to assist in maintaining the gap 57 along the length of the pipe assembly. Rather than the illustrated 120° spacings for the fins, four fins can be used, each spaced apart 90° from an adjacent fin. In another example, two 180°-spaced fins can be employed. The fins 53 can run the length of the outer pipe and can be sized in length so that a free end 55 of each fin 53 is adjacent to the aluminum layer 52. In this embodiment, there is no need for a connection between the free end 25 and the line set pipe 58, as the fins 53 together position the inner pipe 58 in an annular configuration with respect to the outer pipe 51. Preferably, the fins are an integral part of the outer pipe such that the fins can be made when the outer pipe is made. Then, the fin-containing outer pipe is positioned around the inner pipe to form the pipe assembly. If the fins are made as separate components, the fins can be attached to either the inner pipe or outer pipe, e.g., some bonding technique using adhesives, welding, etc.

A third spacer structure can also involve components of the outer pipe itself. In this embodiment, the outer pipe includes drawn-down sections along the length thereof. In this embodiment, and with reference to FIGS. 6 and 7, the pipe assembly is designated by the reference numeral 60 and the outer pipe is designated by the reference numeral 61. The same inner pipe 61 and aluminum layer 66 of FIGS. 3-5 can be employed in this embodiment.

Figure 6:
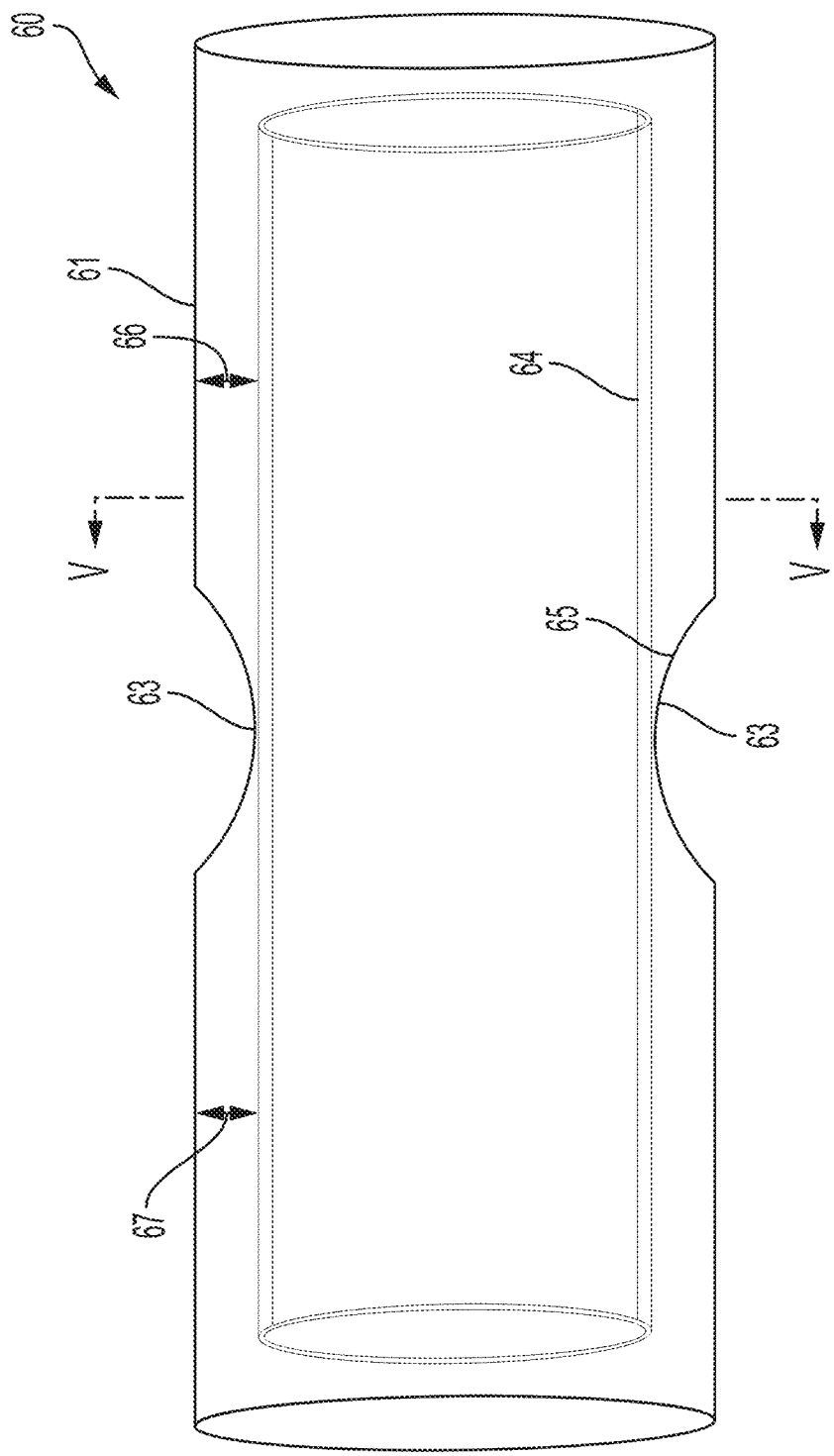
FIG. 6 depicts a schematic of a third embodiment of the inventive pipe assembly with yet another spacer structure.
Figure 7:
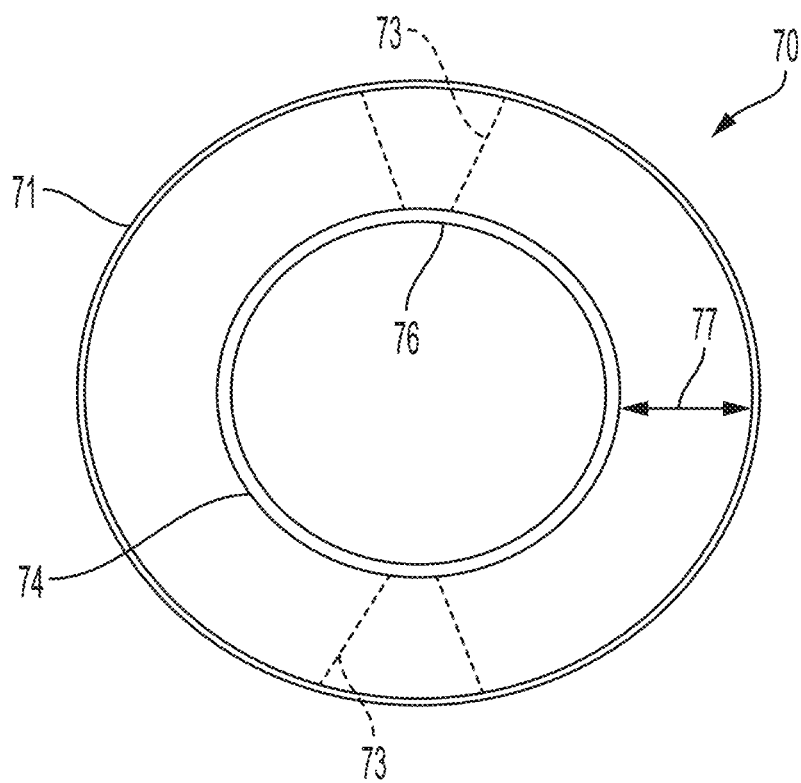
FIG. 7 depicts a cross section of an inventive pipe assembly with another drawn-down spacer.

FIG. 6 shows a side cross-sectional view of the pipe assembly showing the outer pipe 61 with drawn down sections 63 positioned along a length of the outer pipe 61 and FIG. 7 shows a sectional view. The drawn-down sections can be formed in any manner, including as part of an extruding process to make the outer pipe 71 or a later step once the outer pipe 71 is made. For example, a crimping press can be used to create an annular or point drawn-down region.

The drawn-down section 73 functions as a spacer structure and is formed so that drawn down sections are spaced along the length of the outer pipe. The drawn down section 73 can maintain the gap 77 formed by the diameter difference between the inner pipe 74 and the outer pipe 71. While the spacing between adjacent drawn down sections 73 can vary, an exemplary range of a spacing is 1 to 6 feet, with a more preferred spacing of about 12 inches. The drawn-down sections can be made so that the inner surface 75 can contact the outer surface 76 of the inner pipe 74.

While two drawn-down sections are illustrated, more than two drawn-down sections can be implemented, e.g., in spacings like that shown in FIG. 5 for the fins 53 and described for this embodiment. The drawn-down sections may also be formed so as to have a 360° (i.e., annular) configuration and contact the inner pipe along its entire periphery.

The inner pipe can be composed of a variety of non-metallic, metallic materials, or combinations thereof, e.g., as described herein. The non-metallic materials preferably include one of thermoplastics and thermoplastic elastomers, and more preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like. The low-e outer surface can occupy the outer surface of the inner pipe and can be composed of roll-formed aluminum, extruded aluminum, or some other low-e surface-containing material, e.g., a metallized film that is readily available on the market, that is part of the inner pipe 31. The low-e outer surface of the inner pipe can be a material separate from the inner pipe, e.g., a film that is bonded to the inner pipe or aluminum that is roll-formed and compressed to the inner pipe or directly extruding over the inner pipe. In this embodiment, the inner pipe 31 can constitute at least two layers, with the presence of the low-e material of one layer creating the low-e outer surface of the inner pipe. The low-e outer surface functions as part of the reflective insulation system with the gap formed between the plastic outer pipe and the inner line set pipe, where the spacer structures can maintain the gap along the length of the pipe assembly.

The inner pipe 31 can also be composed of an aluminum pipe or other metal pipe where the outer surface thereof functions as the low-e surface.

The outer pipe 35 can also be composed of any material that permits the creation of the gap around the inner pipe. Examples include one of thermoplastics and thermoplastic elastomers, and preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like. These polymeric materials can provide a solid and durable plastic outer pipe. However, the plastic outer pipe can also be made of laminated plastic films, e.g., PET or similar materials, and can be sized to slide over the inner pipe, creating an air gap.

When using the clip 39 as a spacer, the clip can be composed of any material, including metallic and non-metallic materials or combinations thereof, that can provide sufficient support to create and maintain the gap of the reflective insulation system. Exemplary materials include molded thermoplastics and thermoplastic elastomers, preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like. The clip 39 can also be composed of a metallic material that can be stamped or cut to shape. The clip spacer can also be made of a foam material.

The same kind of materials described above for the FIG. 3 embodiment for the inner pipe can also compose the inner pipe of the embodiments in FIGS. 5-7.

For the outer pipe of the embodiments of FIGS. 5-7, the outer pipe can also have the type of construction described above for the outer pipe described for FIGS. 3 and 4.

While the reflective insulation system can include a low-e surface as the outer surface of the inner pipe, the low-e surface can also be located on the inner surface of the outer pipe 5. For example, the outer pipe 35 can include a low-e layer (e.g., aluminum or metallized film) bonded to the inner surface of the outer pipe 35. The techniques and types of material discussed above for providing the low-e surface as part of the inner pipe 31 can also be employed for the inner surface of the outer pipe 35.

Figure 8:
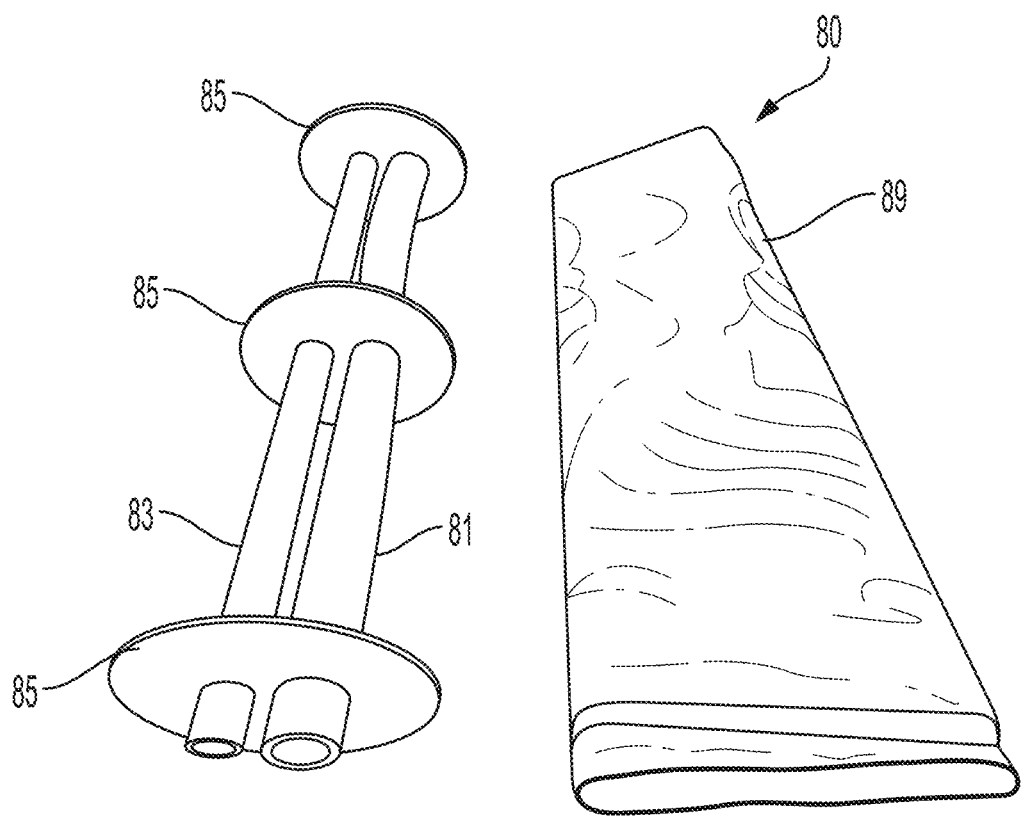
FIG. 8 depicts a line set pipe assembly in an unassembled state according to an embodiment of the invention.

Yet another embodiment of the invention can include a reflective insulation system with conventional line set piping. In this embodiment, both the suction or return line and the liquid line are employed along with a spacer and an outer thermal insulation sleeve. Referring to FIG. 8, an unassembled pipe construction designated by the reference numeral 80 is shown with a suction line 81 and liquid line 83, the two lines 81 and 83 held in a spaced apart relationship by three spacers 85, and an outer thermal insulation sleeve 89. The spacers 85 are circular in shape and define two openings, one opening designed to receive the liquid line 83 and the other opening designed to receive the suction line 81. The spacers 85 are separated from each other in a similar manner as the spacer structures and spacings using for the embodiments of FIGS. 3-7. The spacers can be made to attach to the lines 81 and 83 in the same ways as the clip 39 is attached to the inner pipe 31 so as to retain the spacers in a given location and maintain the space created by the diameter difference between the outer thermal insulation sleeve 89 and lines 81 and 83 along the length of the lines 81 and 83.

Figure 9:
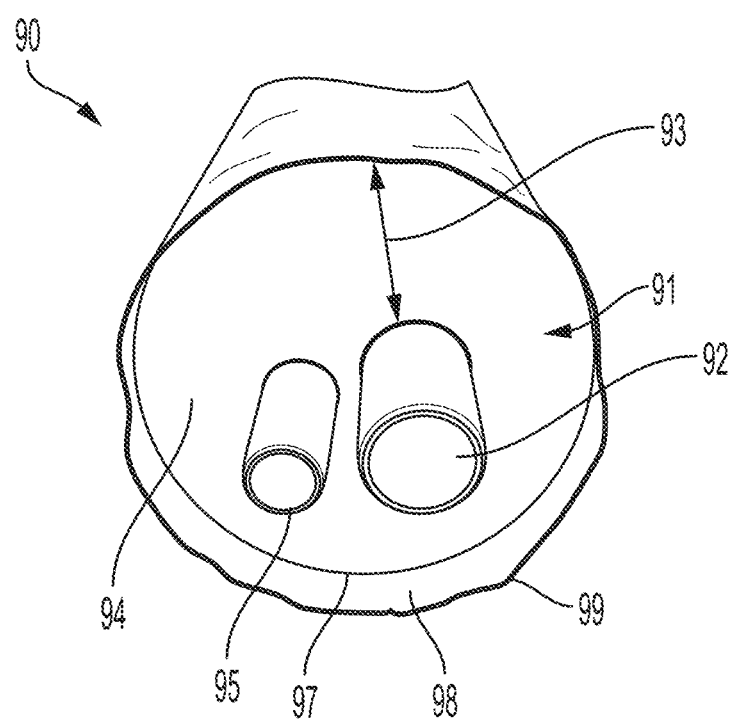
FIG. 9 depicts the line set pipe assembly of FIG. 8 in an assembled state according to an embodiment of the invention.

As shown in FIG. 9, the spacers, when measured in a cross sectional direction through the spacer and lines 92 and 93, create a gap or spacing 51 between the outer surfaces of two lines 92 and 93 and the peripheral edge 97 of the spacers and inner surface 98 of the outer thermal insulation sleeve 99.

For the construction of the lines 81 and 83, a variety of materials and constructions can be used.

One multilayer pipe construction has an outer layer that is made of one of thermoplastics and thermoplastic elastomers, preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like. The outer layer is bonded to an aluminum or stainless steel layer that is bonded to an inner layer that is made of one of thermoplastics and thermoplastic elastomers, preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like.

Another multilayer pipe construction has an outer aluminum or other low-e surface (low e optional) that is bonded to an inner layer that is made of one of thermoplastics and thermoplastic elastomers, preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like.

Other possible materials and constructions for the lines 81 and 83 include: solid aluminum pipe or some other solid metal with a low-e surface, although the low-e surface is optional on the lines 81 and 83, especially if the low-e surface is used as part of the outer sleeve 89; solid metal pipe (copper, stainless steel, etc.); and solid plastic pipe that is made of one of thermoplastics and thermoplastic elastomers, preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like.

Figure 10:
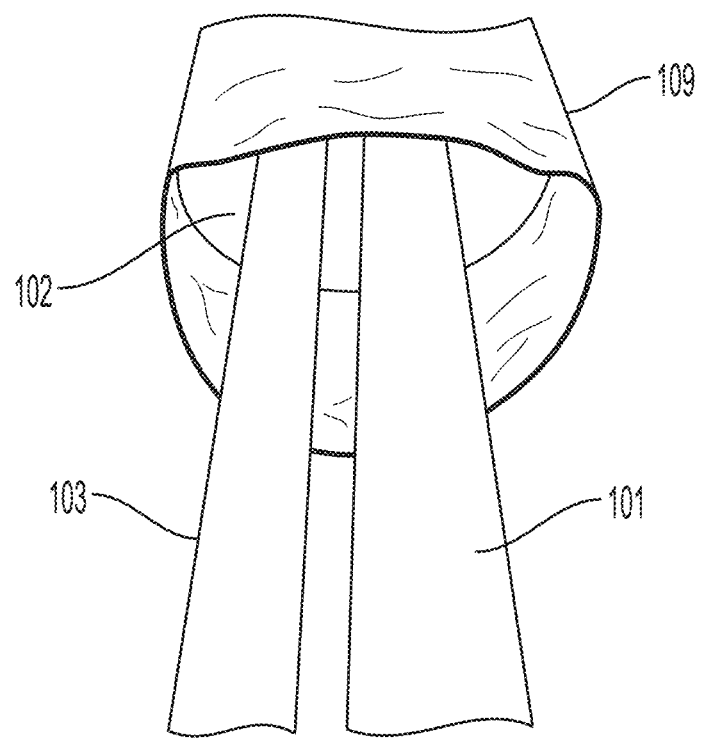
FIG. 10 depicts the line set pipe assembly of FIG. 9 with a greater length to show the space surrounding the lines of the line set pipe assembly according to an embodiment of the invention.

As depicted in FIG. 10, the diameter of the sleeve 109 is made so that it extends over the spacers and creates the space that surrounds the lines 101 and 103. With reference to FIG. 9, the line 92 is spaced from the inner surface of the sleeve 99, where the spacing distance is represented in one direction by line 93 in FIG. 9. The other line 95 is also spaced a distance from the inner surface 98 of the outer thermal insulation sleeve. While the distance between the line 92 and the sleeve 99 is not uniform as a result of the presence of both lines 92 and 95 in the space 91 (unlike the uniform gap in FIG. 3 for example), the space 91 functions as a separation or gap between the outer surfaces of the lines 92 and 95 and the inner surface 98 of the outer thermal insulation sleeve 99. The space 91 cooperates in the formation of a reflective insulation system for the pipe assembly 90. Once the lines 92 and 95 are assembled with the spacers 94, the outer thermal insulation sleeve 99 can be slid over the spacers 94 to create the assembly 90. To create the reflective insulation system for the embodiment of FIGS. 8-10, the outer thermal insulation sleeve 99 is made, in one embodiment, with its inner surface being a low-e material, similar to the low-e surface of the inner pipe 31 of FIG. 3. An example of an outer thermal insulation sleeve can be a laminated plastic film with the reflective layer on the inside of the sleeve, with such a sleeve being flexible along its length and cross section. The outer thermal insulation sleeve can also be a rigid pipe having a low-e material, e.g., aluminum, as part of the inside of the rigid pipe, e.g. a layer of aluminum or other low-e material bonded to the inside of the rigid pipe. The rigid pipe can also be a metallic material with a low-e surface, including an aluminum pipe that includes a highly reflective inner surface.

While the embodiments of FIGS. 8-10 use a low-e surface on the inner surface of the outer thermal insulation sleeve 99, one or both of the lines 92 and 95 can include low-e outer surfaces in substitution of that found on the inner surface of the sleeve 99.

While the outer thermal insulation sleeve 99 is shown with one type of construction, e.g., plastic laminated film (PET or other similar material) with an inner low-e surface, other constructions can be employed. These constructions can include a multilayer pipe construction with an outer layer that is made of one of thermoplastics and thermoplastic elastomers, preferably polyethylene, cross-linked polyethylene, polyethylene of raised temperature, polypropylene, polyvinyl chloride, polyamide, fluoropolymers, polyvinylidene fluoride, fluorinated ethylene propylene, perfluroalkoxy alkane, and the like bonded to an inner aluminum or other low e surface. The outer thermal insulation sleeve can also be solid aluminum pipe or some other solid metal material having a low-e surface.

While the spacer 94 is shown as surrounding the lines 92 and 95, it can have a different shape so long as the spacer sufficiently engages the lines 92 and 95 to hold them in a spaced apart relationship with each other and the inner surface of the outer thermal insulation sleeve 99 so as to create the space for the reflective insulation system. The spacer configuration shown in FIGS. 8-10 can also include some attachment feature to the lines 92 and 95 or outer thermal insulation sleeve. However, such an attachment feature to hold the spacers in place can be optional if the outer thermal insulation sleeve 99 is of a flexible nature such that its engagement with the spacers can hold the spacers in place. However, a clip like that shown in FIG. 3 can also be used, the clip having a cut out for each of the lines 92 and 95 and an attachment feature to secure the clip to the lines 92 and 95, e.g., crimping, snapping, and the like. The spacer 94 can be made out of the same materials as outlined above for the clip 39.

A preferred construction of the pipe assembly of the embodiments of FIGS. 3-10 can include an inner pipe that is made of one of a polyethylene of raised temperature (PERT) or a cross linked polyethylene (PEX) that includes an aluminum layer bonded to the outer surface thereof, the aluminum layer functioning as the low-e surface of the reflective insulation system. The outer pipe can also be made of the same polymeric materials as the inner pipe. Another preferred construction for the inner pipe is a pipe construction that includes two layers of either PERT or PEX with an aluminum layer positioned in between these two layers. With this construction, if the inner pipe is to include the low-e surface, an additional layer can be added to the outer surface of the PERT-AL-PERT or PEX-AL-PEX pipe.

The inventive pipe construction has a number of advantages over the prior art pipe construction used for line sets and the like. Unlike the typical line set construction that uses a foam insulation, the hard outer pipe better protects the pipe assembly from damage during the installation process. The hard outer pipe is also less likely to be compressed and a reduction in thermal properties is avoided, unlike the prior art line set wherein the foam insulation can be compressed and/or damaged and thermal properties can be compromised. The outer pipe can stand up to the outside elements and will not deteriorate, which is not the case for typical line set foam insulation.

Manufacturing advantages are also obtained with the inventive pipe construction as the outer pipe can be produced and installed over the inner pipe in the same production stream allowing for faster production times. In contrast, when using the prior art foam insulation, the foam is separately manufactured and then later combined with a line set pipe, which is a much slower product making operation.

The foam insulation used in prior art pipes is normally extruded and this kind of extrusion equipment is very costly compared to a simple plastic pipe extrusion line. Also, the foam insulation extrusion equipment takes up greater floor space than that of a plastic pipe extrusion line and the extrusion process for making the foam insulation is very slow compared to that of a plastic pipe.

The inner and outer pipes, when cylindrical in shape, can be made in any known ways. When making the outer pipe having the fins or drawn down sections, the pipes can be extruded or the like. The spacers can be molded if made from plastic or cut or stamped if made from metal.

When making the clip-using embodiment, generally, the clip can be attached to the inner pipe and then the outer pipe can be positioned over the spacer-containing inner pipe. The fin-containing outer pipe can be extruded directly over the inner pipe. Similarly, the pipe having the drawn-down sections can be extruded over the inner pipe and as part of the extruding process, the drawn-down sections can be formed. In the alternative, the outer pipe can be positioned over the inner pipe and the drawn-down sections formed thereafter.

Figure 11:
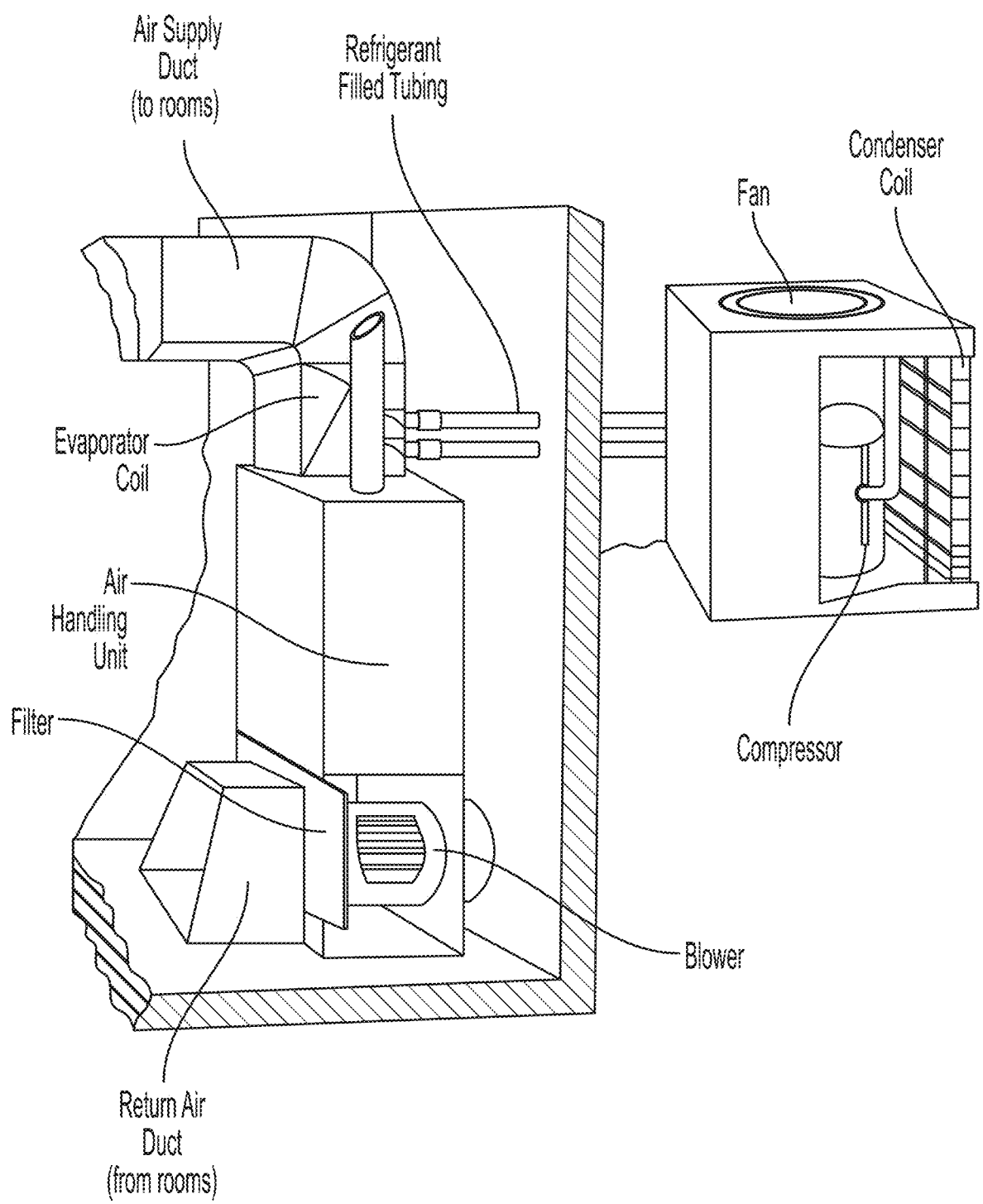
FIG. 11 depicts a typical refrigeration system.

The inventive pipe assemblies can be used in any application that typical line set piping is used. For example, the single pipe assembly of FIGS. 3-7 can be used as the suction line in a line set providing refrigeration for a given application such as that depicted in FIG. 11. The two line set of FIGS. 8-10 can be used in replacement of a conventional line set in a refrigeration system. However, this is only an example of a refrigeration system suitable to use the inventive pipe assemblies, and the pipe assemblies of the invention can be used in other systems.

In fact, any application where a pipe with a flowing fluid there through or a set of pipes with flowing fluid are in need of insulation exists, the pipe assembly of the invention can be implemented, either where the pipe assembly uses a single pipe for fluid flow such as that disclosed in FIGS. 3-7, or an application that uses a plurality of lines or pipes as illustrated in FIGS. 8-10.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A composite refrigeration line set comprising:
at least one selected from the group consisting of: a suction line and a return line, characterized in that one or more of the suction line and the return line are a composite refrigeration line set tube comprising:
an inner plastic tube;
a first adhesive layer positioned about the inner plastic tube;
an aluminum layer positioned about the first adhesive layer and coupled to the inner plastic tube via the first adhesive layer;
a second adhesive layer positioned about the aluminum layer; and
an outer plastic layer positioned about the aluminum layer coupled to the aluminum layer via the second adhesive layer;
wherein:
the inner plastic tube is polyethylene of raised temperature;
the outer plastic tube is polyethylene of raised temperature;
the aluminum layer comprises AL 3555-O; and
the aluminum layer has a thickness range for a given pipe size as follows for the indicated pipe sizes:

| Pipe Size (in) | AL 3555-O (in) |
|---|---|
| ¼" | 0.01-0.018. |

2. The composite refrigeration line set of claim 1, wherein the aluminum layer is butt-welded to itself.

3. The composite refrigeration line set of claim 1, wherein the aluminum layer does not include a corrosion-inhibiting protective coating.

4. The composite refrigeration line set of claim 1, further comprising:
a low-emissivity layer positioned about the outer plastic layer.

5. The composite refrigeration line set of claim 4, wherein the low-emissivity layer comprises low-emissivity aluminum.

6. The composite refrigeration line set of claim 4, wherein the low-emissivity layer comprises a metallized film.

7. The composite refrigeration line set of claim 1, wherein the composite refrigeration line set tube has a burst pressure in excess of 1950 pounds per square inch.

8. The composite refrigeration line set of claim 1, further comprising:
a reinforcement layer.

9. A refrigeration system comprising:
a compressor;
an evaporator coil;
the composite refrigeration line set according to claim 1 coupled between the compressor and the evaporator coil to form a fluid circuit between the compressor and the evaporator coil; and
a refrigerant received within the fluid circuit.

10. A composite refrigeration line set comprising:
at least one selected from the group consisting of: a suction line and a return line, characterized in that one or more of the suction line and the return line are a composite refrigeration line set tube comprising:
an inner plastic tube;
a first adhesive layer positioned about the inner plastic tube;
an aluminum layer positioned about the first adhesive layer and coupled to the inner plastic tube via the first adhesive layer;
a second adhesive layer positioned about the aluminum layer; and
an outer plastic layer positioned about the aluminum layer coupled to the aluminum layer via the second adhesive layer;
wherein:
the inner plastic tube is polyethylene of raised temperature;
the outer plastic tube is polyethylene of raised temperature;
the aluminum layer comprises AL 3555-O; and
the aluminum layer has a thickness range for a given pipe size as follows for the indicated pipe sizes:

| Pipe Size (in) | AL 3555-O (in) |
| --- | --- |
| ⅜" | 0.014-0.022 |
| ½" | 0.02-0.028 |
| ⅝" | 0.028-0.035. |

11. The composite refrigeration line set of claim 10, wherein the aluminum layer is butt-welded to itself.

12. The composite refrigeration line set of claim 10, wherein the composite refrigeration line set tube has a burst pressure in excess of 1950 pounds per square inch.

13. The composite refrigeration line set of claim 10, further comprising:
a reinforcement layer.

14. A refrigeration system comprising:
a compressor;
an evaporator coil;
the composite refrigeration line set according to claim 10 coupled between the compressor and the evaporator coil to form a fluid circuit between the compressor and the evaporator coil; and
a refrigerant received within the fluid circuit.

15. A composite refrigeration line set comprising:
at least one selected from the group consisting of: a suction line and a return line, characterized in that one or more of the suction line and the return line are a composite refrigeration line set tube comprising:
an inner plastic tube;
a first adhesive layer positioned about the inner plastic tube;
an aluminum layer positioned about the first adhesive layer and coupled to the inner plastic tube via the first adhesive layer;
a second adhesive layer positioned about the aluminum layer; and
an outer plastic layer positioned about the aluminum layer coupled to the aluminum layer via the second adhesive layer;
wherein:
the inner plastic tube is polyethylene of raised temperature;
the outer plastic tube is polyethylene of raised temperature;
the aluminum layer comprises AL 3555-O; and
the aluminum layer has a thickness range for a given pipe size as follows for the indicated pipe sizes:

| Pipe Size (in) | AL 3555-O (in) |
| --- | --- |
| ¾" | 0.033-0.041. |

16. The composite refrigeration line set of claim 15, wherein the aluminum layer is butt-welded to itself.

17. The composite refrigeration line set of claim 15, wherein the composite refrigeration line set tube has a burst pressure in excess of 1950 pounds per square inch.

18. The composite refrigeration line set of claim 15, further comprising:
a reinforcement layer.

19. A refrigeration system comprising:
a compressor;
an evaporator coil;
the composite refrigeration line set according to claim 17 coupled between the compressor and the evaporator coil to form a fluid circuit between the compressor and the evaporator coil; and
a refrigerant received within the fluid circuit.

20. A composite refrigeration line set comprising:
at least one selected from the group consisting of: a suction line and a return line, characterized in that one or more of the suction line and the return line are a composite refrigeration line set tube comprising:
an inner plastic tube;
a first adhesive layer positioned about the inner plastic tube;
an aluminum layer positioned about the first adhesive layer and coupled to the inner plastic tube via the first adhesive layer;
a second adhesive layer positioned about the aluminum layer; and an outer plastic layer positioned about the aluminum layer coupled to the aluminum layer via the second adhesive layer;

wherein:
the inner plastic tube is polyethylene of raised temperature;
the outer plastic tube is polyethylene of raised temperature;
the aluminum layer comprises AL 3555-O; and
the aluminum layer has a thickness range for a given pipe size as follows for the indicated pipe sizes:

| Pipe Size (in) | AL 3555-O (in) |
|---|---|
| ⅞" | 0.037-0.047 |
| 1 ⅛" | 0.047-0.059. |

21. The composite refrigeration line set of claim 20, wherein the aluminum layer is butt-welded to itself.

22. The composite refrigeration line set of claim 20, wherein the composite refrigeration line set tube has a burst pressure in excess of 1950 pounds per square inch.

23. The composite refrigeration line set of claim 20, further comprising:
a reinforcement layer.

24. A refrigeration system comprising:
a compressor;
an evaporator coil;
the composite refrigeration line set according to claim 20 coupled between the compressor and the evaporator coil to form a fluid circuit between the compressor and the evaporator coil; and
a refrigerant received within the fluid circuit.

* * * * *